Patented Nov. 24, 1953

2,660,578

UNITED STATES PATENT OFFICE 2,660,578

TRIAZINE FLUORESCENT AGENTS

William W. Williams, Easton, Pa., and William E. Wallace, Rensselaer, N. Y., assignors to General Aniline & Film Corporation, New York, N. Y., a corporation of Delaware No Drawing. Application January 23, 1952, Serial No. 267,921

6 Claims. (Cl. 260—247.1)

This invention relates to novel fluorescent agents derived from 4,4'-diamino-2,2'-stilbene disulfonic acid.

We have found that valuable intermediates for producing fluorescent agents may be obtained by condensing one molecular proportion of 4,4'-diamino-2,2'-stilbene disulfonic acid with two molecular proportions of cyanuric chloride. The thus obtained triazyl derivative of the 4,4'-diamino-2,2'-stilbene disulfonic acid is then further condensed with two molecular proportions of an amino benzyl ether of the type described in the copending application of Saul R. Buc and David I. Randall, Serial No. 128,919, filed November 22, 1949, and having the formula

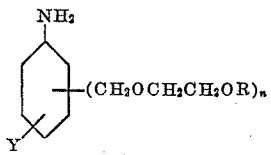

Formula I wherein Y represents a member of the group consisting of hydrogen and methyl and $n$ represents the integers 1 or 2 and R represents hydrogen, hydroxyethyl or lower alkylmethyl.

There is thus obtained a novel intermediate of the present invention which may be represented by the following formula

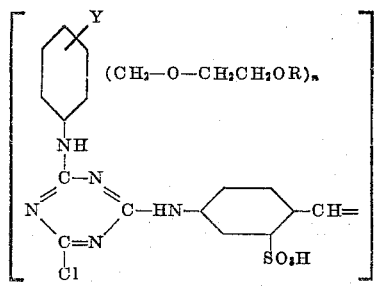

Formula II wherein $n$, Y and R are as defined above.

By condensation of this novel intermediate with at least two molecular proportions of an amine or organic hydroxy compound, valuable fluorescent agents are obtained. In case an amine is to be condensed with this novel intermediate, it may be selected from the group consisting of primary and secondary lower (1-4 carbon atoms) alkyl amines (e. g. dimethyl amine, diethyl amine, etc.), primary and secondary lower (1-2 carbon atoms) alkylol amines (e. g. mono- or di-ethanolamine) and primary and secondary aryl amines (e. g., aniline, N-methyl- or N-ethyl-aniline, toluidine, anisidine) and heterocyclic amines (e. g., pyrimidine, tetrazole, benzothiazole, thiazole, pyridine, morpholine, thiomorpholine). If an organic hydroxy compound is to be condensed with this novel intermediate, it may be selected from the group consisting of alkanols, preferably 1-4 carbon atoms (e. g. methanol, ethanol, propanol or butanol), aryl hydroxy compounds (e. g. phenol, monomethyl- or monoethyl-ethers of resorcinol, hydroquinone or pyrocatechol etc.) and heterocyclic hydroxy compounds (e. g., hydroxy quinolines, hydroxy quinaldines, etc.).

The thus obtained fluorescent agents, when incorporated, either in the form of the free sulfonic acids or ammonium or alkali metal salts thereof, into paper or other wrapping material improve the whiteness as well as protect the contents from the action of ultraviolet light. They are useful in improving the whiteness of paints; when applied to fabrics by methods well known in the art, the whiteness is remarkably improved. The white background of photographic prints and diazotype prints can be improved by incorporating some of the material into the coating formulations. By addition of some of the materials to discharge pastes, the whites which are obtained upon discharge are remarkably whiter than discharges which are made in the absence of this material. If small amounts of these materials are used in soaps or other detergents, fabrics which are washed using these formulations will be much whiter in the case of whites and brighter in the case of colors than fabrics which are washed with ordinary soaps or detergents. These materials may be used in bleaching processes for various fibers. In such cases, the amount of bleach necessary is materially reduced.

The novel intermediate for and the novel fluorescent agents of the present invention and their method of preparation may be most readily described by consideration of specific examples thereof:

EXAMPLE I

Thirty-seven parts (0.2 mole) of cyanuric chloride are dissolved in 120 parts of acetone and poured into a mixture of ice and water. During the suspension in ice water, the temperature of the aqueous suspension should not rise above 5° C. Thirty-seven parts (0.1 mole) of 4,4'-diaminostilbene-2,2'-disulfonic acid are dissolved in 150 parts of water with the addition of enough sodium carbonate to give a neutral solution. This solution is added slowly to the cyanuric chloride suspension and at the same time a solution of sodium carbonate is added in order to keep the mixture from becoming too acid. The temperature should not rise above 5° C. during this condensation. The condensation is complete when a sample of the reaction mixture which has been acidified and treated with sodium nitrite does not develop color when treated with an alkaline solution of R salt.

When the condensation is complete, a solution of 51 parts (or two moles) of 2,2'-(4-amino-2,6-tolylenedimethoxy) diethanol

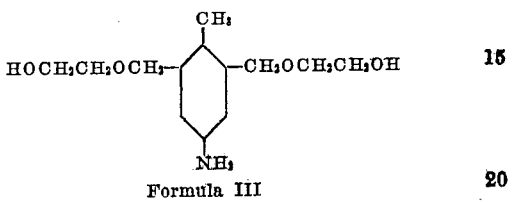

Formula III is added and immediately afterward a solution of 160 parts of anhydrous sodium acetate in 400 parts of water is added. The mixture is allowed to warm to room temperature and may be heated to 35-40° C. if necessary to complete the condensation. There is thus obtained a novel intermediate of the formula given above in which Y is methyl, R is hydrogen and $n$ is 2.

When this secondary condensation is complete, 30 parts (0.3 mole or approximately 50% excess) of diethanolamine is added and the pH is increased to 8–8.5 with sodium carbonate solution. Then the mixture is heated slowly to 90° C. and maintained at that temperature for 3 hours. The mixture is then cooled and the product is isolated in the usual manner.

The material which is obtained is tan in color and moderately soluble in water but very sparingly soluble in acetone, alcohol, ether, etc. It corresponds to the formula:

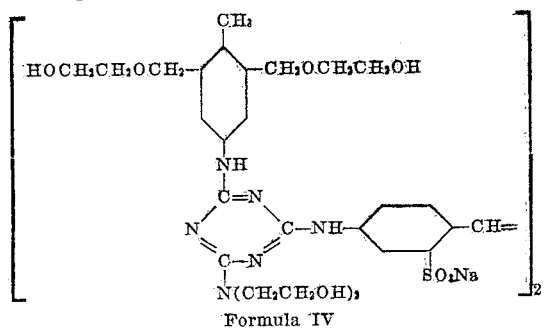

Formula IV

When this material is incorporated into discharge pastes and applied to fabrics, the whites thus obtained are remarkably whiter than those obtained using ordinary discharge pastes. When this material is applied to fabrics of cellulose, wool or nylon by methods well known in the art, the white appearance of the fiber is thereby much improved. If small amounts of this substance are added to soaps or other detergents and the resulting mixture is used to wash fabrics of cellulose, wool, or nylon, the white materials thus washed are extraordinarily whiter in appearance and colored materials are brighter than similar materials which are washed using ordinary soaps or detergents.

The detailed procedure of the foregoing example has been employed to produce a number of the novel products of the present invention. These novel products may be represented by the following general formula:

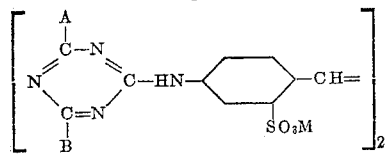

Formula V in which B represents the residue of the particular amine or hydroxy compound employed and A represents the residue of the particular amino benzyl ether employed. More specifically the novel compounds may be represented by the following general formulae:

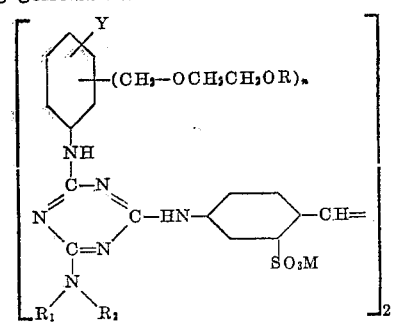

Formula VI and

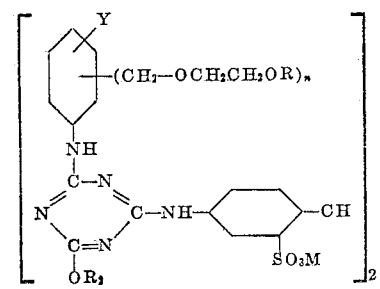

Formula VII in which Y represents hydrogen or methyl, R represents ethanol or methyl, $n$ represents 1 or 2, M represents hydrogen or ammonium or alkali metal and $R_1$ may represent hydrogen or lower (1-4 carbon atoms) alkyl group such as —$CH_3$, —$C_2H_5$, —$CH(CH_3)_2$, $n$ or sec.
—$C_4H_5$, —$CH_2CH_2OH$, —$CH_2OH$ and $R_2$ may represent one of the alkyl or alkylol groups of the type given above or aryl, such as phenyl, methoxy phenyl or heterocyclics such as pyrimidine, tetrazole, benzothiazole, pyridino, etc. and finally the group

may represent cyclic residues such as pyrimidino, morpholino, thiomorpholine.

Since other typical fluorescent agents, which had properties substantially parallel to the properties of the product of Example I of this invention, have been produced by duplicating the detailed procedure described above in Example I while replacing in the diethanolamine employed in Example I with corresponding molecular quantities of other amines or hydroxy compounds and/or using in place of the 2,2'-4-amino-2,6-toluenedimethoxy diethanol corresponding molecular quantities of other amino benzyl ethers of the type indicated; the complete details of their preparation are not given but (1) the particular amino benzyl ether and/or (2) the particular amine or organic hydroxy compound used in their preparation are given in Table I below, together with the nature of the substituents in the final product for the particular reactants employed. In each case the same molar amounts of reactants were used as in Example I (i. e., 0.2 mole cyanuric chloride, 0.1 mole 4,4'-diamino-2,2'-stilbene disulfonic acid, 0.2 mole amino benzyl ether and 0.3 mole of amine or organic hydroxy compound).

*Table I*

| Example | 1<br>Amino benzyl ether employed | A<br>Substituent A in formula V | 2<br>Amine or organic hydroxy compound used | B<br>Substituent B in formula V |
|---|---|---|---|---|
| II | NH$_2$, HOCH$_2$CH$_2$OCH$_2$—⟨ ⟩—CH$_2$OCH$_2$CH$_2$OH, CH$_3$ | NH, HOCH$_2$CH$_2$OCH$_2$—⟨ ⟩—CH$_2$OCH$_2$CH$_2$OH, CH$_3$ | HN(CH$_3$)$_2$ | —N(CH$_3$)$_2$ |
| III | NH$_2$, HOCH$_2$CH$_2$OCH$_2$—⟨ ⟩—CH$_2$OCH$_2$CH$_2$OH, CH$_3$ | NH, HOCH$_2$CH$_2$OCH$_2$—⟨ ⟩—CH$_2$OCH$_2$CH$_2$OH, CH$_3$ | H$_2$N—⟨ ⟩—OCH$_3$ | —HN—⟨ ⟩—OCH$_3$ |
| IV | NH$_2$, HOCH$_2$CH$_2$OCH$_2$—⟨ ⟩—CH$_2$OCH$_2$CH$_2$OH, CH$_3$ | NH, HOCH$_2$CH$_2$OCH$_2$—⟨ ⟩—CH$_2$OCH$_2$CH$_2$OH, CH$_3$ | HN(CH$_2$—CH$_2$)$_2$O (morpholine) | —N(CH$_2$—CH$_2$)$_2$O |
| V | NH$_2$, HOCH$_2$CH$_2$OCH$_2$—⟨ ⟩—CH$_2$OCH$_2$CH$_2$OH, CH$_3$ | NH, HOCH$_2$CH$_2$OCH$_2$—⟨ ⟩—CH$_2$OCH$_2$CH$_2$OH, CH$_3$ | CH$_3$OH | —OCH$_3$ |
| VI | NH$_2$, HOCH$_2$CH$_2$OCH$_2$—⟨ ⟩—CH$_2$OCH$_2$CH$_2$OH, CH$_3$ | NH, HOCH$_2$CH$_2$OCH$_2$—⟨ ⟩—CH$_2$OCH$_2$CH$_2$OH, CH$_3$ | ⟨ ⟩—OH | ⟨ ⟩—O— |
| VII | NH$_2$, HOCH$_2$CH$_2$OCH$_2$—⟨ ⟩—CH$_2$OCH$_2$CH$_2$OH, CH$_3$ | NH, HOCH$_2$CH$_2$OCH$_2$—⟨ ⟩—CH$_2$OCH$_2$CH$_2$OH, CH$_3$ | H$_3$CO—⟨ ⟩—OH | H$_3$CO—⟨ ⟩—O— |
| VIII | NH$_2$, HOCH$_2$CH$_2$OCH$_2$—⟨ ⟩—CH$_2$OCH$_2$CH$_2$OH, CH$_3$ | NH, HOCH$_2$CH$_2$OCH$_2$—⟨ ⟩—CH$_2$OCH$_2$CH$_2$OH, CH$_3$ | 8-hydroxyquinoline (N, OH) | 8-quinolyloxy (N, O—) |
| IX | NH$_2$, HOCH$_2$CH$_2$OCH$_2$—⟨ ⟩—CH$_2$OCH$_2$CH$_2$OH, CH$_3$ | NH, HOCH$_2$CH$_2$OCH$_2$—⟨ ⟩—CH$_2$OCH$_2$CH$_2$OH, CH$_3$ | ⟨ ⟩—NH—CH$_3$ | ⟨ ⟩—N(CH$_3$)— |

| Example | 1<br>Amino benzyl ether employed | A<br>Substituent A in formula V | 2<br>Amine or organic hydroxy compound used | B<br>Substituent B in formula V |
|---|---|---|---|---|
| X | 4-NH₂, 3-CH₃, 1,2-bis(HOCH₂CH₂OCH₂) benzene | 4-NH-, 3-CH₃, 1,2-bis(HOCH₂CH₂OCH₂) benzene | C₆H₁₁-NH₂ (aniline) | C₆H₅-NH- |
| XI | 4-NH₂, 3-CH₃, 1,2-bis(HOCH₂CH₂OCH₂) benzene | 4-NH-, 3-CH₃, 1,2-bis(HOCH₂CH₂OCH₂) benzene | H₃CO-C₆H₄-NH₂ | H₃CO-C₆H₄-NH- |
| XII | 4-NH₂, 3-CH₃, 1,2-bis(HOCH₂CH₂OCH₂) benzene | 4-NH-, 3-CH₃, 1,2-bis(HOCH₂CH₂OCH₂) benzene | 2-aminopyridine | 2-pyridyl-NH- |
| XIII | 4-NH₂-C₆H₄-CH₂OCH₂CH₂OH | 4-NH--C₆H₄-CH₂OCH₂CH₂OH | HN(CH₂CH₂OH)₂ | -N(CH₂CH₂OH)₂ |
| XIV | 4-NH₂-C₆H₄-CH₂OCH₂CH₂OH | 4-NH--C₆H₄-CH₂OCH₂CH₂OH | HN(CH₃)₂ | -N(CH₃)₂ |
| XV | 4-NH₂-C₆H₄-CH₂OCH₂CH₂OH | 4-NH--C₆H₄-CH₂OCH₂CH₂OH | H₂N-C₆H₄-OCH₃ | HN-C₆H₄-OCH₃ |
| XVI | 4-NH₂, 3-CH₃, 1-CH₂OCH₂CH₂OH benzene | 4-NH-, 3-CH₃, 1-CH₂OCH₂CH₂OH benzene | HN(CH₂CH₂OH)₂ | -N(CH₂CH₂OH)₂ |
| XVII | 4-NH₂, 3-CH₃, 1-CH₂OCH₂CH₂OH benzene | 4-NH-, 3-CH₃, 1-CH₂OCH₂CH₂OH benzene | morpholine (HN(CH₂CH₂)₂O) | morpholino (-N(CH₂CH₂)₂O) |
| VIII | 4-NH₂, 3-CH₃, 1-CH₂OCH₂CH₂OH benzene | 4-NH-, 3-CH₃, 1-CH₂OCH₂CH₂OH benzene | HN(CH₃)₂ | -N(CH₃)₂ |

| Example | 1. Amino benzyl ether employed | A Substituent A in formula V | 2. Amino or organic hydroxy compound used | B Substituent B in formula V |
|---|---|---|---|---|
| XIX | NH₂–⌬–CH₂OCH₂CH₂OH, CH₃ | NH–⌬–CH₂OCH₂CH₂OH, CH₃ | H₂N–⌬–OCH₃ | –HN–⌬–OCH₃ |
| XX | NH₂–⌬–CH₂(OCH₂CH₂)₃OCH₃ | –NH–⌬–CH₂(OCH₂CH₂)₃OCH₃ | HN(CH₂CH₂OH)₂ | –N(CH₂CH₂OH)₂ |
| XXI | NH₂–⌬–CH₂(OCH₂CH₂)₂OCH₃ | –NH–⌬–CH₂(OCH₂CH₂)₂OCH₃ | HN(CH₃)₂ | –N(CH₃)₂ |
| XXII | H₂N–⌬–CH₂OCH₂CH₂OCH₂CH₂OH | HN–⌬–CH₂OCH₂CH₂OCH₂CH₂OH | HN(CH₂CH₂OH)₂ | –N(CH₂CH₂OH)₂ |
| XXIII | H₂N–⌬–CH₂OCH₂CH₂OCH₂CH₂OH | HN–⌬–CH₂OCH₂CH₂OCH₂CH₂OH | H₂N–⌬–OCH₃ | –HN–⌬–OCH₃ |

It will be apparent that the products obtained in the above examples were produced in the form of their sodium salts. However, the free acids, if desired, may be obtained by the acidification of the thus obtained sodium salts and other salts such as ammonium or potassium salts produced therefrom by neutralization of the free acids.

It will also be apparent that the potassium salts may be obtained directly by replacing the sodium carbonate and acetate in the above examples with potassium carbonate and acetate, respectively.

Where spirit solubility is desired the amine salts such as dicyclohexyl amine salts may be produced by neutralization of the free acids.

We claim:

1. Flourescent agents which in the form of the free acid have the formula

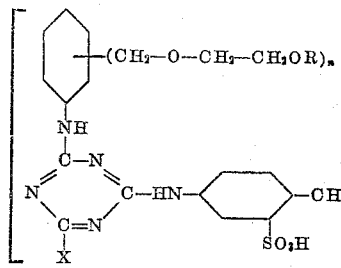

wherein R represents a member of the group consisting of hydrogen, hydroxy alkyl and lower alkyl, $n$ represents one of the integers 1 and 2, and X represents a member of the group consisting of halogen, secondary dialkylamino, secondary N-lower alkyl aryl amino, primary monocyclic aryl amino, lower alkoxy, monocyclic aryloxy, morpholino and amino pyridine.

2. Fluorescent agents which in the form of the free acid have the formula

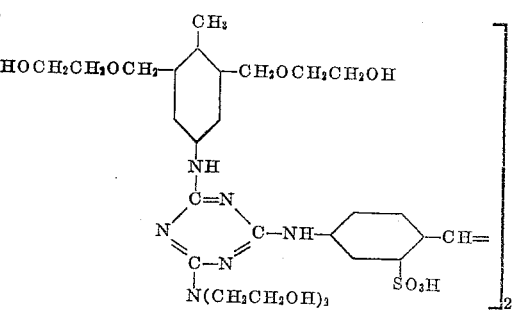

3. Fluorescent agents which in the form of the free acid have the formula

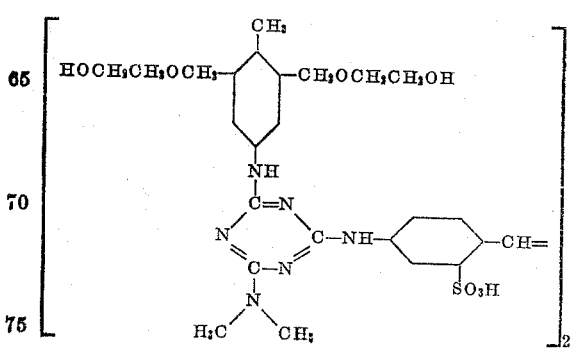

4. Fluorescent agents which in the form of the free acid have the formula

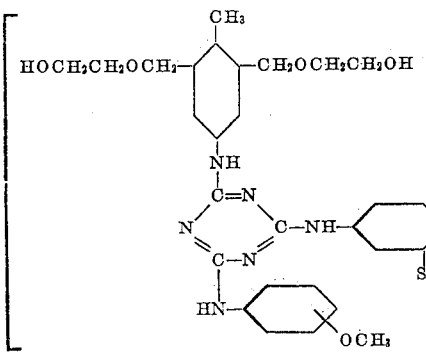

5. Fluorescent agents which in the form of the free acid have the formula

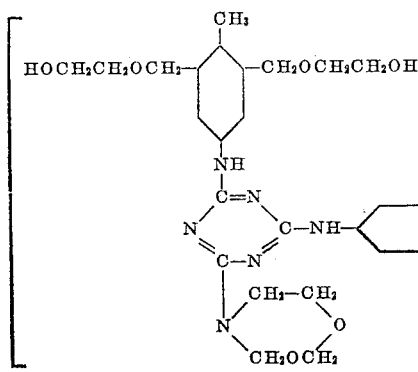

6. Fluorescent agents which in the form of the free acid have the formula

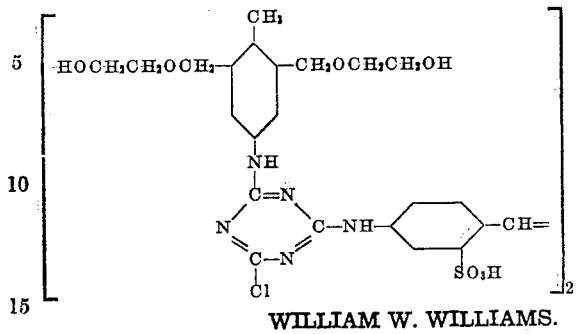

WILLIAM W. WILLIAMS.
WILLIAM E. WALLACE.

References Cited in the file of this patent

UNITED STATES PATENTS

| Number | Name | Date |
|---|---|---|
| 2,171,427 | Eggert | Aug. 29, 1939 |
| 2,376,743 | Wendt | May 22, 1945 |

FOREIGN PATENTS

| Number | Country | Date |
|---|---|---|
| 624,052 | Great Britain | of 1949 |